US008469803B2

(12) United States Patent  (10) Patent No.: US 8,469,803 B2
Farah et al.  (45) Date of Patent: Jun. 25, 2013

(54) GAMING METHOD, SERVER, AND COMPUTER READABLE MEDIUM FOR DISTRIBUTING A TOTAL POOL BETWEEN A CHARITY POOL AND A PRIZE POOL

(75) Inventors: Anthony Robert Farah, Concord West (AU); William Andrew King, Manly (AU); Norman Brinkman, Double Bay (AU)

(73) Assignee: Anthony Robert Farah, Concord, West Australia ( * ) Notice: Subject to any disclaimer, the term of this patent is extended or adjusted under 35 U.S.C. 154(b) by 0 days.

(21) Appl. No.: 13/402,716

(22) Filed: Feb. 22, 2012

(65) Prior Publication Data

US 2013/0059639 A1 Mar. 7, 2013

(30) Foreign Application Priority Data

Feb. 24, 2011 (AU) ................................ 2011900648

(51) Int. Cl.
 *A63F 9/24* (2006.01)
 *A63F 13/00* (2006.01)
(52) U.S. Cl.
 USPC ............................................ 463/26; 463/25
(58) Field of Classification Search
 USPC ........... 463/1, 25–29, 40–42; 705/14.1–14.73
 See application file for complete search history.

(56) References Cited

U.S. PATENT DOCUMENTS

| 6,102,395 | A | * | 8/2000 | Such | 273/139 |
| 2003/0050853 | A1 | * | 3/2003 | Salls | 705/26 |
| 2004/0181468 | A1 | * | 9/2004 | Harmon et al. | 705/29 |
| 2005/0171840 | A1 | * | 8/2005 | Rinehart | 705/14 |
| 2005/0215306 | A1 | * | 9/2005 | O'Donnell et al. | 463/17 |
| 2007/0238501 | A1 | * | 10/2007 | Blass | 463/10 |
| 2008/0065513 | A1 | * | 3/2008 | McHale et al. | 705/27 |
| 2008/0076511 | A1 | * | 3/2008 | Fisk | 463/19 |
| 2008/0108433 | A1 | * | 5/2008 | DiMichele et al. | 463/40 |
| 2009/0170586 | A1 | * | 7/2009 | Jonathan et al. | 463/17 |
| 2009/0209327 | A1 | * | 8/2009 | Herrington | 463/25 |
| 2009/0327122 | A1 | * | 12/2009 | Isac | 705/39 |
| 2010/0004055 | A1 | * | 1/2010 | Gormley et al. | 463/25 |
| 2011/0070945 | A1 | * | 3/2011 | Walker et al. | 463/25 |

* cited by examiner

*Primary Examiner* — Milap Shah
(74) *Attorney, Agent, or Firm* — Workman Nydegger (57) ABSTRACT

Disclosed herein are a method and system for distributing funds associated with a game. The method receives a plurality of requests to enter the game and processes each request to issue a corresponding ticket in the game. Each ticket is associated with a donation to a selected charity and a pledge amount. The method determines a total pool of funds derived from the tickets and determines a winning ticket of the game from the plurality of tickets issued in response to the requests. The method then distributes the total pool of funds between a charity pool and a prize pool, dependent upon the donations and the pledge amount associated with the winning ticket.

14 Claims, 6 Drawing Sheets

GAMING METHOD, SERVER, AND COMPUTER READABLE MEDIUM FOR DISTRIBUTING A TOTAL POOL BETWEEN A CHARITY POOL AND A PRIZE POOL

CROSS-REFERENCE TO RELATED APPLICATIONS

This application claims the right of priority under 35 U.S.C. §119 based on Australian Provisional Patent Application No. 2011900648 entitled "Gaming method and system", filed on 24 Feb. 2011 in the name of Anthony Robert Farah, the entire contents of which are incorporated herein by reference as if fully set forth herein.

BACKGROUND OF THE INVENTION

1. The Field of the Invention

The present disclosure relates generally to gaming and, in particular, to a method and system for distributing funds associated with a game.

2. The Relevant Technology

It is common to distribute prizes amongst contestants participating in various games. Such games include games of skill and games of chance and include, for example, lotteries and raffles. Games may also include betting or gambling on the outcome of an event, including a sporting event. The prizes are often derived from entry fees paid by the contestants, and may be supplemented by funds contributed by sponsors. Such sponsors may include, for example, government agencies and commercial entities seeking to promote products.

In some games, the promoter of a game retains a portion of funds associated with a game in exchange for conducting the game. A first portion of an entry fee or gambled amount is retained by the respective promoter and a second portion of the entry fee is allocated to pay any necessary government taxes. The remaining portion of the entry fee is allocated to a prize pool, from which prize amounts are allocated amongst the gaming contestants. This model is utilized in many lotteries and other legalized gambling activities, such as betting on horse racing and the like. Depending on the particular application, the first portion of funds retained by the promoter may be sufficient only to cover administrative costs. Alternatively, the promoter may retain a greater portion of funds to generate a profit.

In some lotteries and gambling activities, the prize pool that is ultimately distributed among winning contestants is dependent upon the amount of money wagered on the game. For example, it is known to operate a lottery wherein a minimum grand prize is offered. If sufficient sums are wagered prior to the lottery being drawn, the lottery may increase the grand prize, and possibly other prizes, dependent upon the total funds wagered. Similarly, the prize pool to be distributed among people that have gambled on a horse race is typically dependent upon the total funds wagered on that particular race.

Charities are known to raise funds by raffling prizes or conducting lotteries. A person willing to assist the charity or desirous of winning a prize offered in a charity raffle buys one or more tickets in the raffle. Typically, the full ticket price is donated to the charity and the prizes offered by the charity are fixed. Depending on the jurisdiction in which the raffle is conducted, a ticket purchaser may be able to claim the price of the ticket as a deduction on an income taxation return. Once a predefined number of tickets in the raffle have been sold or a predefined date is reached, the raffle is drawn. One or more prizes are then allocated among the ticket holders, based on tickets that are drawn. The charity hopes to raise funds by selling tickets of greater value than the prizes being offered. Charity lottery participants generally enter charity raffles in order to support a given charity or charities. Nonetheless, most participants are motivated to enter a charity raffle by an opportunity to win a high value prize. Typically, the prizes being raffled are donated or purchased by the charity at greatly discounted prices. This enables the charity offering the prizes to raise more funds.

A need exists to provide an improved method and system for allocating funds associated with a game.

BRIEF SUMMARY OF THE INVENTION

It is an object of the present disclosure to overcome substantially, or at least ameliorate, one or more disadvantages of existing arrangements.

According to a first aspect of the present disclosure, there is provided a gaming server for conducting a game associated with a charity pool and a prize pool, wherein the server includes a memory for storing data and a computer program, and a processor coupled to the memory for executing the computer program stored in the memory. The server also includes a ticketing module for processing each request to issue a corresponding ticket in the game. Each ticket is associated with ticketing information that includes a donation to a charity and a pledge amount. The server further includes a database for storing ticketing information associated with each ticket issued in response to the requests, and a game application forming part of the computer program. The game application includes instructions for performing the method steps of: determining a total pool of funds derived from the tickets; determining a winning ticket of the game from tickets, based upon the stored ticketing information; and distributing the total pool of funds between the charity pool and the prize pool, dependent upon the donations and the pledge amount associated with the winning ticket.

According to a second aspect of the present disclosure, there is provided a gaming server for conducting a game associated with a charity pool and a prize pool. The gaming server comprises a memory for storing data and a computer program; a processor coupled to the memory for executing said computer program stored in the memory; a ticketing module for processing each request to issue a corresponding ticket in said game, wherein each ticket is associated with ticketing information that includes a donation to a charity and a pledge amount. The donation amount associated with each ticket corresponds to a portion of a price of that ticket, and the pledge amount associated with a ticket provides a means of adjusting the prize and charity pools should the ticket win the game. The server also comprises a database for storing ticketing information associated with each ticket issued in response to said requests; and a game application forming part of said computer program. The game application includes instructions for performing the method steps of determining a total pool of funds derived from the tickets; determining a minimum value of the charity pool based upon said stored ticketing information, said minimum value being a sum of the donation amounts of the issued tickets; determining a winning ticket of said game from the issued tickets, based upon said stored ticketing information; determining a pledged charity amount according to the donations and the pledge amount associated with the winning ticket; and distributing said total pool of funds between the charity pool and the prize pool, according to the determined pledged charity amount associated with the winning ticket. The total pool of funds is distributed such that the charity pool has a value of the greater value of (i) the minimum charity amount and (ii) the determined pledged charity amount; and the prize pool comprises remaining funds of the total pool.

According to a further aspect of the present disclosure, there is provided a computer-implemented method of conducting a game. The method includes the steps of: receiving, via a communications network, a plurality of requests to enter the game; and processing each request to issue a corresponding ticket in the game, wherein each ticket is associated with ticketing information that includes a donation to a selected charity and a pledge amount. The method determines a total pool of funds derived from the tickets and determines a winning ticket of the game from the plurality of tickets, dependent upon the ticketing information. The method then distributes the total pool of funds between a charity pool and a prize pool, dependent upon the donations and the pledge amount associated with the winning ticket.

According to a yet further aspect of the present disclosure, there is provided a computer readable storage medium having a computer program recorded therein, the program being executable by a computer apparatus to make the computer perform a method for conducting a game. The program includes: code for processing requests to purchase a plurality of tickets in the game, wherein each ticket is associated with a donation to a selected charity and a pledge amount; code for determining a total pool of funds derived from selling the plurality of tickets; code for determining a winning ticket of the game from the plurality of tickets; and code for distributing the total pool of funds between a charity pool and a prize pool, dependent upon the donations and the pledge amount associated with the winning ticket.

According to another aspect of the present disclosure, there is provided an apparatus for implementing any one of the aforementioned methods.

According to another aspect of the present disclosure, there is provided a computer program product including a computer readable medium having recorded thereon a computer program for implementing any one of the methods described above.

Other aspects of the present disclosure are also disclosed.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. At least one embodiment of the invention will be described and explained with additional specificity and detail through the use of the accompanying drawings in which.

DETAILED DESCRIPTION OF THE PREFERRED EMBODIMENTS

Where reference is made in any one or more of the accompanying drawings to steps and/or features that have the same reference numerals, those steps and/or features have for the purposes of this description the same function(s) or operation(s), unless the contrary intention appears.

The present disclosure provides a method and system for distributing funds associated with a game. The game is run in association with a set of charities, wherein the set of charities includes at least one charity. The method and system distribute funds associated with the game between a prize pool and a charity pool, at least. In one implementation, the game is run in a networked communications environment, wherein tickets are purchased in an online environment via one or more computing devices coupled to a communications network.

Each ticket in the game is associated with a donation and a pledge. The donation and pledge amounts may be linked or separate. The donation corresponds to a portion of the ticket price that is donated to at least one charity from the set of charities. The portion may range from 0% to 100% of the ticket price or may be restricted or limited to a predefined donation range, depending on the particular application. For example, one game may operate with a donation range of 40% to 80%, wherein a ticket purchaser nominates a portion of the ticket price in the donation range to the donation. The donation range may be limited by one or more of a charity, a regulatory authority, a gaming operator, and a ticket selling agency. In one arrangement, the portion of the ticket price to be donated is predefined. The predefined portion may be stipulated by a regulatory authority, an operator of the game, a charity associated with the game, or a ticket selling agency. For example, tickets sold in the game by a first charity may have a predefined portion of 50% of the ticket price defined as the donation associated with those tickets. Tickets sold in the same game by a second charity may have a predefined portion of 40% of the ticket price defined as the donation associated with those tickets. In an alternative implementation, the method and system enable a purchaser of a ticket in an instance of the game to nominate a portion of the ticket price to be donated to a selected charity from the set of charities. In a further arrangement, the purchaser of a ticket nominates a portion of the ticket price to be donated to the set of charities and the manner in which such donations are distributed among charities in the set of charities is determined by a regulatory authority, an operator of the game, or a combination thereof. The donation amount of each ticket purchased forms a minimum contribution to charity associated with that ticket.

The method and system also enable the purchaser to pledge a portion of either any potential winnings to which the purchaser may be entitled or a portion of the total prize pool, depending on the application. The pledge is associated with the purchased ticket. In one implementation, the pledge is dependent upon the donation, wherein the portion of the ticket price corresponding to the donation is also recorded as the pledge associated with that ticket. Thus, if the donation is 50% of the ticket price, then the pledge is 50% of the potential winnings or 50% of the total prize pool, depending on the particular application. In another implementation, the donation and the pledge are independent. In one arrangement, the pledge is predefined by one or more of a regulatory authority, an operator of the game, a charity associated with the game, or a ticket selling agency. In another arrangement, the purchaser is able to select different amounts for the donation and the pledge. In a further arrangement, the donation is predefined and the purchaser is able to select the pledge amount. In a yet further arrangement, the purchaser selects the donation and the pledge amount is predefined. In one arrangement, a game operates with a pledge range of 40% to 80%, wherein a ticket purchaser nominates a pledge within the pledge range. In further arrangements, the pledge may be removed by defining a pledge of 0%. In particular implementations, the pledge amount may have a predefined minimum positive value, such as, say, 1, 2 or 5%. The pledge range may be limited by one or more of a charity, a regulatory authority, a gaming operator, and a ticket selling agency. However, regardless of the pledge, at least the donation amount of each purchased ticket of the contest is donated to charity.

The recorded pledge associated with the winning ticket is used to distribute the total pool of funds between the prize pool awarded to the holder of the winning ticket and the charity pool donated to charity. Thus, the method and system of the present disclosure determines the actual amounts for the charity pool and the prize pool, dependent upon the amounts committed to the charity pool by the contestants when purchasing their respective tickets and the portion of the total pool pledged by the prize winning contestant(s).

Each instance of a game is associated with a charity pool and a prize pool. The minimum size of the charity pool is dependent upon the sum of the amounts donated by the ticket purchasers. That is, the portion of each ticket nominated as a donation at the time the ticket is purchased is a guaranteed amount that is allocated to the charity pool.

The final size of the charity pool is dependent upon the sum of the amounts donated by the ticket purchasers and the portion of the prize pool pledged by the winning ticket holder. The prize pool that is ultimately payable to a winner or winners of the game is dependent upon the final size of the charity pool and is equal to the total pool of funds less the final size of the charity pool. The charity pool cannot be decreased by the pledge amount of a winning ticket. However, the prize pool may be decreased by the pledge amount of a winning ticket. As such, the pledge amount provides a means of adjusting distribution of the total pool of funds to (i) increase the charity pool, or (ii) maximize the prize pool. Ability to set or view the pledge amount is thus likely to attract both contestants who are interested in a high value prize and contestants who are interested in supporting a given charity to participate in a contest.

In one aspect, the charity pool and the prize pool are derived from the revenue raised from sales of ticket in the instance of the game. In one particular implementation, the sum of the charity pool and the prize pool equals the total revenue raised from sales of tickets. In another implementation, the sum of the charity pool and the prize pool equals the total revenue raised from sales of tickets, less a first portion retained by a promoter of that instance of the game, less a second portion retained in accordance with government regulations, such as taxation requirements.

Figure 1:
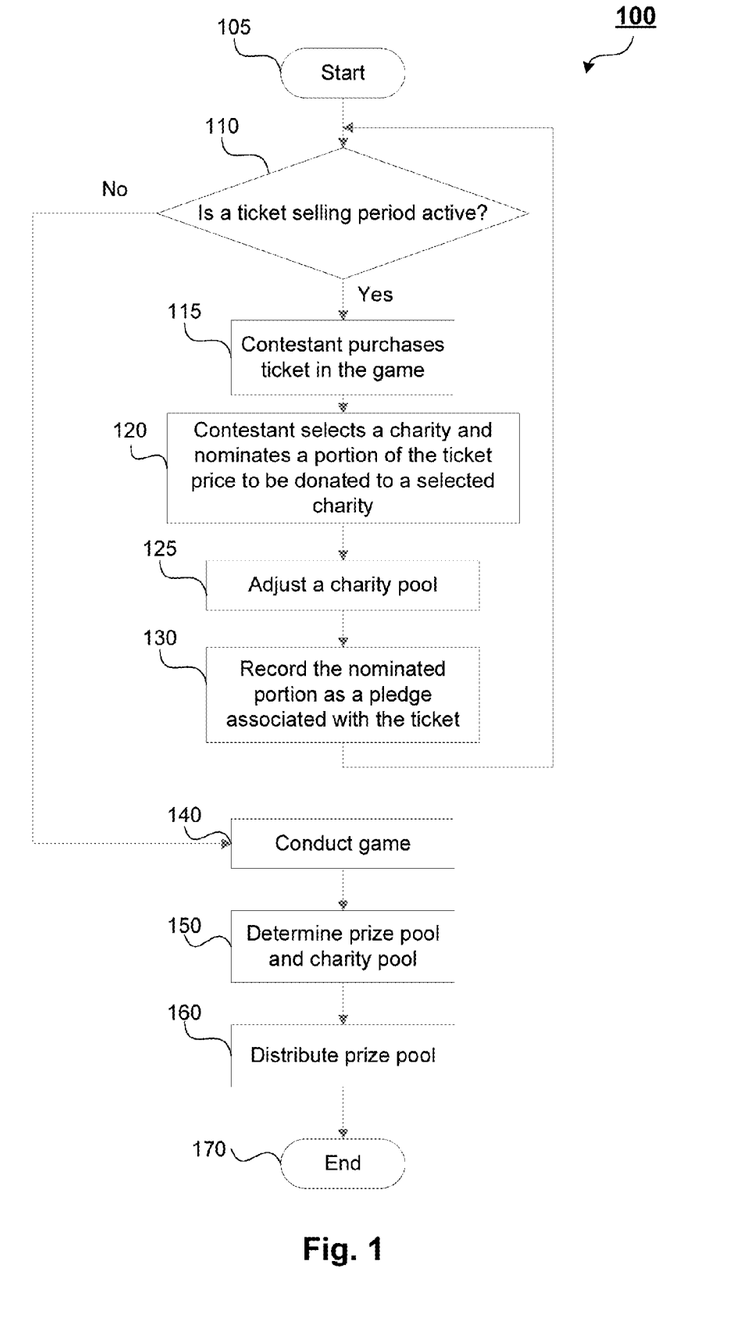
FIG. 1 is a flow diagram of a method of distributing funds associated with a game, in accordance with an embodiment of the present disclosure.

FIG. 1 is a flow diagram that illustrates a method 100 of distributing funds associated with a game, in accordance with the present disclosure. In this example, the game is a lottery being conducted to raise funds for a set of charities, wherein each ticket is associated with a donation and a pledge. In this embodiment, the purchaser of a ticket in the game nominates a donation and a pledge to be associated with the ticket. As described above, other embodiments utilize a predefined donation, a predefined pledge, or a combination thereof.

The method 100 begins at a Start step 105 and proceeds to a decision step 110, which determines whether a ticket selling period, during which contestants are able to purchase tickets in the lottery, is active. In one aspect, the ticket selling period runs until all the tickets in the lottery have been sold. In another aspect, the ticket selling period runs until a minimum number of tickets in the lottery have been sold. In yet another aspect, the ticket selling period runs for a predefined time period between a start date and an end date. Combinations of these are also possible, whereby a ticket selling period runs until a certain number of tickets are sold or until an end date, whichever occurs first.

If step 110 determines that the ticket period is active, Yes, control passes to step 115, in which a contestant purchases a ticket in the lottery. In one implementation, the contestant purchases a ticket by sending a request from a remote computing device over a communication link to a gaming server associated with the game. In a next step 120, the contestant selects a charity from the set of charities associated with the lottery and nominates a portion of the ticket price to donate to the selected charity. This donated amount is committed to the selected charity. In one implementation, the portion of the ticket price nominated by the purchaser is represented as a percentage of the ticket price. Control passes to step 125, in which a charity pool associated with the lottery is increased by the donated amount committed in step 120. The donation contributes to a minimum charity pool, and cannot be transferred to a prize pool of the contest.

Control passes from step 125 to step 130, which records the portion of the prize pool nominated by the purchaser as a pledge associated with that ticket. The portion of prize pool nominated as the pledge may be set independently of the donation portion. If that ticket wins the game, the recorded pledge is used to distribute the total pool of funds between the prize pool awarded to the holder of the winning ticket and the charity pool donated to charity. However, the pledge cannot be used to decrease the charity pool as formed by donations from each ticket of the lottery sold.

In one embodiment, the donation nominated in step 120 and the pledge are linked. Thus, if the purchaser nominates a portion of 50% of the ticket price to be donated to a selected charity, then the system records a pledge of 50% of the total pool of funds to be donated to the charity pool, if that ticket wins the lottery. In another embodiment, the nominated donation and the pledge are independent of one another.

Control returns from step 130 to step 110 and the method 100 iterates through steps 115 to 130 as more tickets are purchased during the ticket selling period. If step 110 determines that the ticket selling period is no longer active, No, control passes from step 110 to step 140, which conducts the game. The actions undertaken by step 140 depend on the particular form of the game. In the example of a lottery or raffle, one or more winning entries/tickets are drawn and prize winners are identified from among the contestants. In this example, the game is a lottery and a single winner is determined. In one implementation, a gaming server conducts the game and determines a winner in accordance with a predefined set of rules associated with the particular game that is being conducted.

After determining a winner, control passes from step 140 to step 150, which distributes the total pool of funds associated with the game to determine the actual amounts for the charity pool and the prize pool, dependent upon two factors:

(i) the amounts committed to the charity pool by the donations; and (ii) the portion of the total pool corresponding to the pledge associated with the prize winning ticket/entry.

As described above with reference to step 125, the charity pool is adjusted when each ticket is purchased, wherein the adjustment corresponds to the nominated portion of the ticket price that is donated. The nominated donations associated with the ticket purchases establish a minimum value of the charity pool.

The method retrieves the pledge associated with the winning ticket. If the minimum value of the charity pool relative to the total pool of funds is less than the pledge associated with the winning ticket, then the value of the charity pool is increased until the value of the charity pool relative to the total pool of funds equals the pledge associated with the winning ticket. The value of the prize pool is decreased by an equal amount, such that the total pool of funds remains the same. Thus, funds are effectively transferred from the prize pool to the charity pool to honor the pledge. However, if the pledge associated with the winning ticket nominates an amount less than the minimum value charity pool (i.e., the total donation amount of all tickets sold), the charity pool remains at a minimum value, and the prize pool at a maximum value, as the donation amounts from each ticket sold are guaranteed to remain in the charity pool.

The manner in which funds are transferred from the prize pool to the charity pool is dependent upon the particular implementation. In one arrangement, the funds transferred from the prize pool to the charity pool are distributed in an equal or predefined manner among charities in the set of charities. In another arrangement, funds transferred from the prize pool to the charity pool are allocated to a charity nominated by the holder of the winning ticket. In another arrangement, funds transferred from the prize pool to the charity pool are distributed among charities in the set of charities in a manner defined by the holder of the winning ticket, by a regulatory authority, by an operator of the game, or a combination thereof.

Having determined the charity pool and the prize pool, control passes from step 150 to step 160, which distributes the prize pool to the winner(s). Control then passes to an End step 170 and the method 100 terminates.

Example 1

In a first example, the game is a lottery being conducted in conjunction with a set of charities, wherein the set of charities includes at least one charity. In this example, as established by the game operator, the pledge amounts are based upon the total pool. In particular, the lottery has 100,000 tickets available, each of which has a price of $10. Thus, the total revenue available from ticket sales is 100,000×$10=$1,000,000. In this example, the set of charities includes three charities that are associated with the lottery: Charity A, Charity B, and Charity C.

A first contestant uses a computing device coupled to a communications network to access a remote gaming server and purchases a ticket in the lottery for $10 at step 115. At step 120, the first contestant accesses a graphical user interface presented by the gaming server and selects Charity B and nominates $5, being 50% of the ticket price, as a donation to Charity B. In step 125, the charity pool increases by $5, corresponding to the portion of the ticket price donated by the first contestant. Depending on the particular implementation, the charity pool may indicate that the sum that has been donated to Charity B has increased by $5.

The first contestant also nominates the portion of the total pool that is to be pledged to the charity pool in the event that the ticket is the winning ticket. In this example, the first contestant pledges 70% of the total pool to charity, in the event that the first contestant is the winner. The gaming server associates the pledge with that particular ticket and records the relevant information associated with each ticket in a database. In one implementation, each ticket is associated with ticketing information, wherein the ticketing information includes a ticket identifier, purchaser contact details, donated portion, and pledge. The ticketing information may also include a gaming token or other information to be utilized in determining a winner of the game.

In this example, all 100,000 tickets are sold, the portion of ticket sales retained by the promoter is equal to zero, and no taxes are payable, so the total pool is $1,000,000. The lottery in this example has a single grand prize, with one ticket being drawn. Further, in this example the total amount committed to Charity A, Charity B, and Charity C in step 120 corresponds to 60% of the total pool. Thus, the minimum charity pool is 60% of $1,000,000=$600,000, based on the donations committed in step 120. Thus, the maximum prize pool is:

Total pool−minimum charity pool=maximum prize pool, which in this case is $1,000,000−$600,000=$400,000.

Continuing the example, the first contestant is drawn as the winner of the lottery in step 140. The first contestant pledged 70% of the total pool to charity, so a total of 70% of the total pool (70% of $1,000,000) is allocated to the charity pool, yielding a pledged charity amount of $700,000. As the pledged charity amount is greater than the minimum charity amount, the game yields an actual charity pool of $700,000.

Any difference between the minimum charity pool and the actual charity pool is reconciled from the prize pool. Thus, in this example $100,000 from the maximum prize pool is transferred to the minimum charity pool to produce the actual charity pool. The actual prize pool becomes $400,000−$100,000=$300,000. The first contestant has thus increased the charity pool and decreased the prize pool using the pledge. The characteristics of Example 1 are shown in Table 1.

TABLE 1

| | |
|---|---|
| Total ticket sales revenue | $1,000,000 |
| Promoter/government portion | $0 |
| Total Pool | $1,000,000 |
| Minimum Charity Pool | $600,000 (=60% of Total Pool) |
| Maximum Prize Pool | $400,000 (=Total Pool − Minimum Charity Pool) |
| Pledged Charity Amount | $700,000 (=70% of Total Pool) |
| Actual Charity Pool | $700,000 (=Pledged Charity Amount > Minimum Charity Pool) |
| Adjustment of Prize Pool | $100,000 (=Actual Charity Pool − Minimum Charity Pool) |
| Actual Prize Pool | $300,000 (=Maximum Prize Pool − Adjustment of Prize Pool) |

In one implementation, any difference between the minimum charity pool and the actual charity pool is allocated to the charity selected by the winning contestant when purchasing the ticket in step 120. In another implementation, any difference between the minimum charity pool and the actual charity pool is distributed amongst the charities in accordance with the proportion of funds donated to the charities in step 120. Alternatively, the winner determines the allocation to one or more charities after the winner is announced.

Example 2

In this example, all 100,000 tickets are sold, the portion of ticket sales retained by the promoter is equal to zero, and no taxes are payable, so the total pool is $1,000,000. The lottery in this example has a single grand prize, with one ticket being drawn and the pledge amount is an amount determined from the prize pool, as established under rules administered by the operator of the game. Further, in this example the total amount committed to Charity A, Charity B, and Charity C in step 120 corresponds to 60% of the total pool. Thus, the minimum charity pool is 60% of $1,000,000=$600,000, based on the donations committed in step 120. Thus, the maximum prize pool is:

Total pool−minimum charity pool=maximum prize pool, which in this case is $1,000,000−$600,000=$400,000.

Continuing the example, the first contestant is drawn as the winner of the lottery in step 140. The first contestant pledged 70% of any winnings to charity, so a total of 70% of the prize pool (70% of $400,000) is allocated to the charity pool, yielding a pledged charity amount of $600,000+$280,00=$880,000. As this pledged amount is greater than the minimum charity pool, the actual charity pool is also $880,000. The remaining 30% of $400,000 ($120,000) goes to the lottery winner. The first contestant has thus increased the charity pool and decreased the prize pool using the pledge. The characteristics of this example are shown in Table 2.

TABLE 2

| | |
|---|---|
| Total ticket sales revenue | $1,000,000 |
| Promoter/government portion | $0 |
| Total Pool | $1,000,000 |
| Minimum Charity Pool | $600,000 (=60% of Total Pool, =total donation) |
| Maximum Prize Pool | $400,000 (=Total Pool − Minimum Charity Pool) |
| Pledged Charity Amount | $280,000 (=70% of Maximum Prize Pool) |
| Actual Charity Pool | $880,000 (Pledged Charity Amount + Minimum Charity Pool) |
| Adjustment of Prize Pool | $280,000 (70% of Maximum Prize Pool) |
| Actual Prize Pool | $120,000 (Maximum Prize Pool − Adjustment of Prize Pool) |

The example provided above allows a set of charities an opportunity to offer a large prize relative to the cost of an entry ticket, based on the number of tickets sold. Offering a large prize may likely make the contests attractive to contestants who would not normally enter a charity draw. As the prize awarded to a winning contestant can in part be donated to the charity (e.g., by the pledge of contestant one on the first example), participants that enter such contests as a means to donate large amounts to charity may also be attracted to entering the contest. A contestant more interested in prize money than charity donation could pledge a lower percentage of the total pool (e.g. 50% of the total pool) than the minimum charity pool, and thus be awarded the maximum prize pool ($400,000) upon winning the contest.

Example 3

In this example, the game is a lottery being conducted in conjunction with at least one charity. In particular, the lottery has 100,000 tickets available, each of which has a price of $1. Thus, the total revenue available from ticket sales is 100,000× $1=$100,000. Three charities are associated with the lottery: Charity A, Charity B, and Charity C. The promoter of the lottery retains 10% of the ticket sales as income and 5% of the ticket sales are payable in government taxes and charges. Also, the pledge amount is based upon the total pool. Thus, the total pool is 85% of the ticket revenue, which is equal to $85,000.

In this example, the average amount of the ticket price donated by the contestants when purchasing tickets is 80%. Thus, this example has the characteristics shown in Table 3.

However, the winning contestant in this instance had pledged 15% of the total pool to charity. As the pledged charity amount of 15% of the total pool ($12,750) is less than the amount committed to the minimum charity pool ($68,000), the actual charity pool is equal to the minimum charity pool. No funds are diverted from the minimum charity pool to "top up" the prize pool. The actual charity pool in this example is $68,000 and the actual winning prize pool is $17,000. Thus, the amount payable to the winning contestant is dependent upon the average donations committed by the other contestants.

TABLE 3

| | |
|---|---|
| Total ticket sales revenue | $100,000 |
| Promoter's portion | $10,000 |
| Government's portion | $5,000 |
| Total Pool | $85,000 |
| Minimum Charity Pool | $68,000 (80% of $85,000) |
| Maximum Prize Pool | $17,000 (Total Pool − Minimum Charity Pool) |
| Pledged Charity Amount | $12,750 (15% of Total Pool) |
| Actual Charity Pool | $68,000 (Minimum Charity Pool > Pledged Charity Amount) |
| Adjustment of Prize Pool | $0 |
| Actual Prize Pool | $17,000 |

Figure 2A:
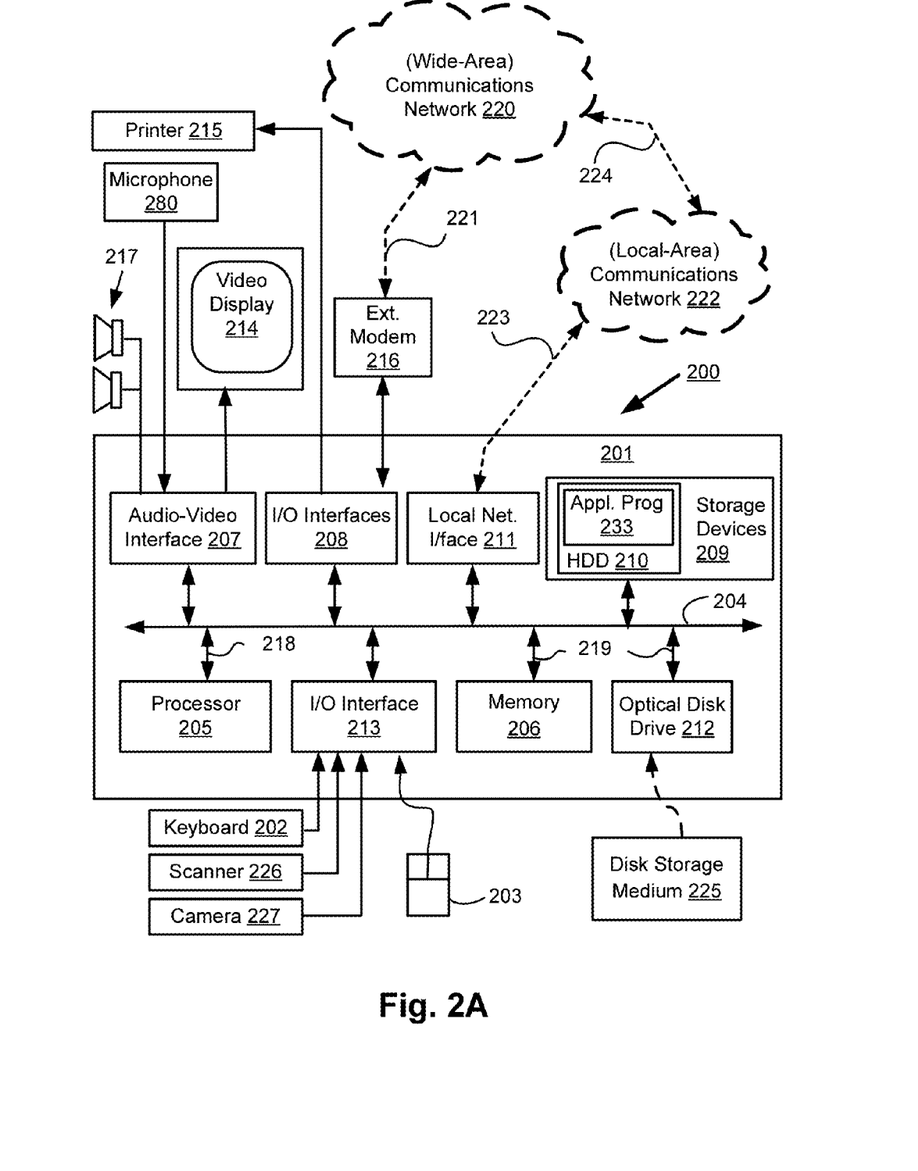
FIGS. 2A and 2B form a schematic block diagram of a general purpose computer system upon which arrangements described can be practiced.
Figure 2B:
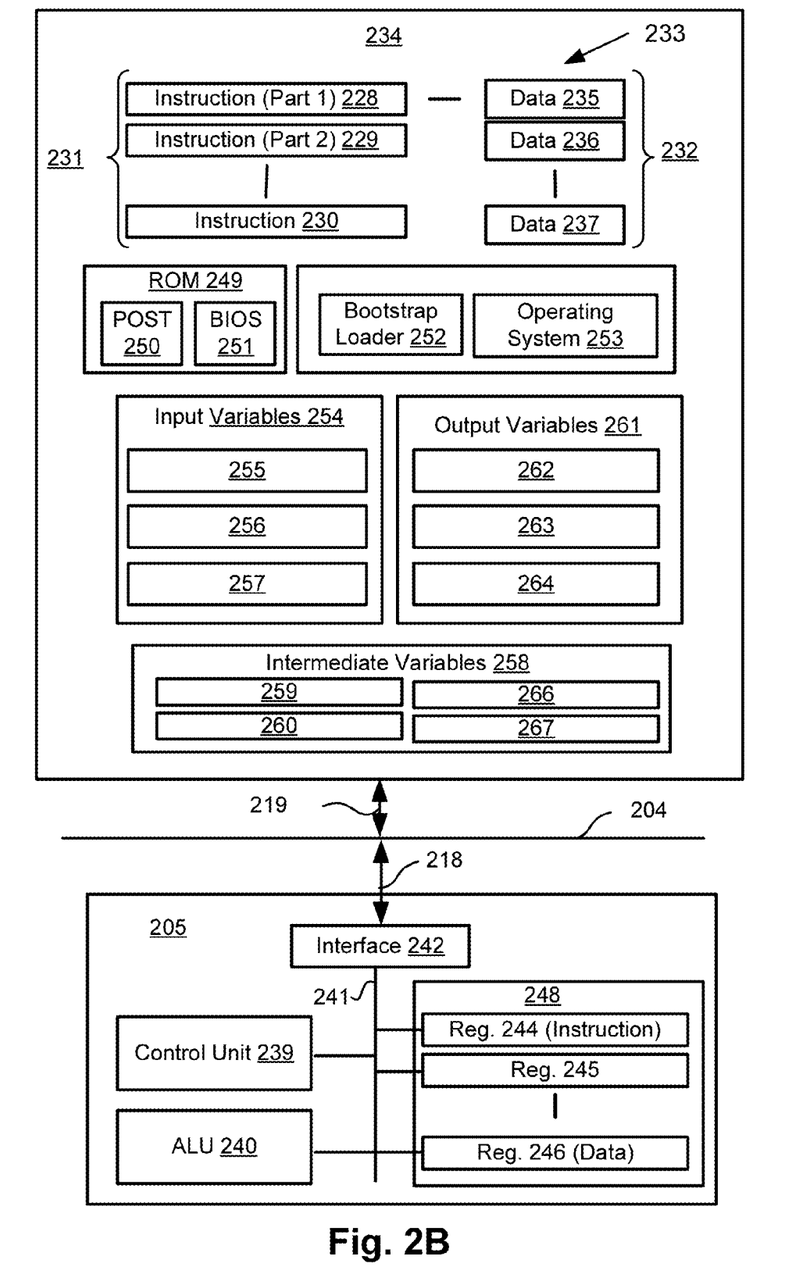

The winning contestant in this example, unlike the previous example, pledged a percentage of the total pool to charity such that the charity pool remained at a minimum value (as calculated according to the donation average donations). Providing such an opportunity to maintain a prize of maximum pool value may appeal to contestants who prefer to obtain a chance to win a high value prize, and donate limited amounts to charity. FIGS. 2A and 2B depict a general-purpose computer system 200, upon which the various arrangements described can be practiced.

As seen in FIG. 2A, the computer system 200 includes: a computer module 201; input devices such as a keyboard 202, a mouse pointer device 203, a scanner 226, a camera 227, and a microphone 280; and output devices including a printer 215, a display device 214 and loudspeakers 217. An external Modulator-Demodulator (Modem) transceiver device 216 may be used by the computer module 201 for communicating to and from a communications network 220 via a connection 221. The communications network 220 may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220.

The computer module 201 typically includes at least one processor unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet circuit card, a Bluetooth™ wireless arrangement or an IEEE 802.11 wireless arrangement; however, numerous other types of interfaces may be practiced for the interface 211.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practiced include IBM-PCs and compatibles, Sun Sparcstations, Apple Mac or alike computer systems.

Figure 3:
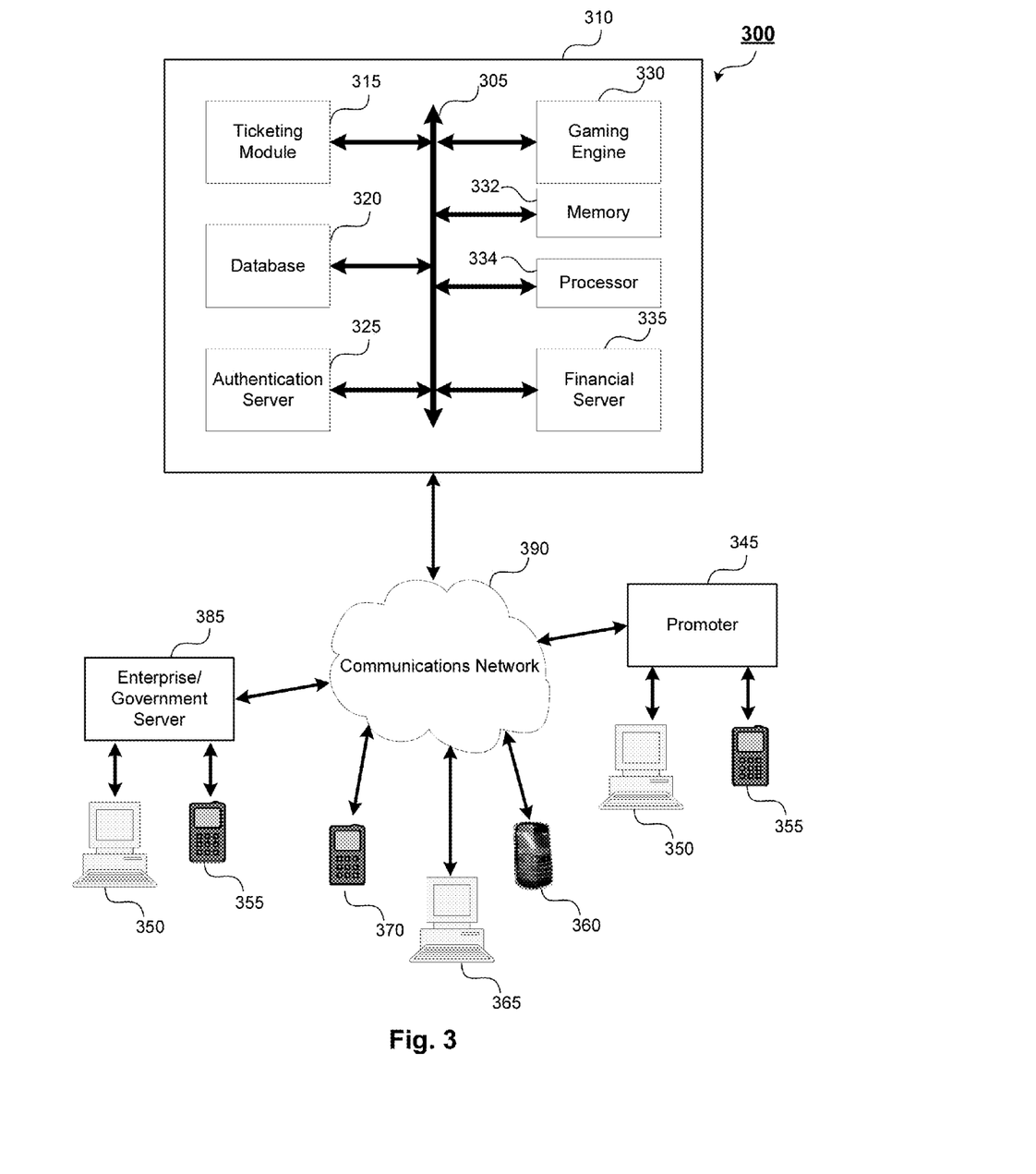
FIG. 3 is a gaming system in accordance with an embodiment of the present disclosure.
Figure 4:
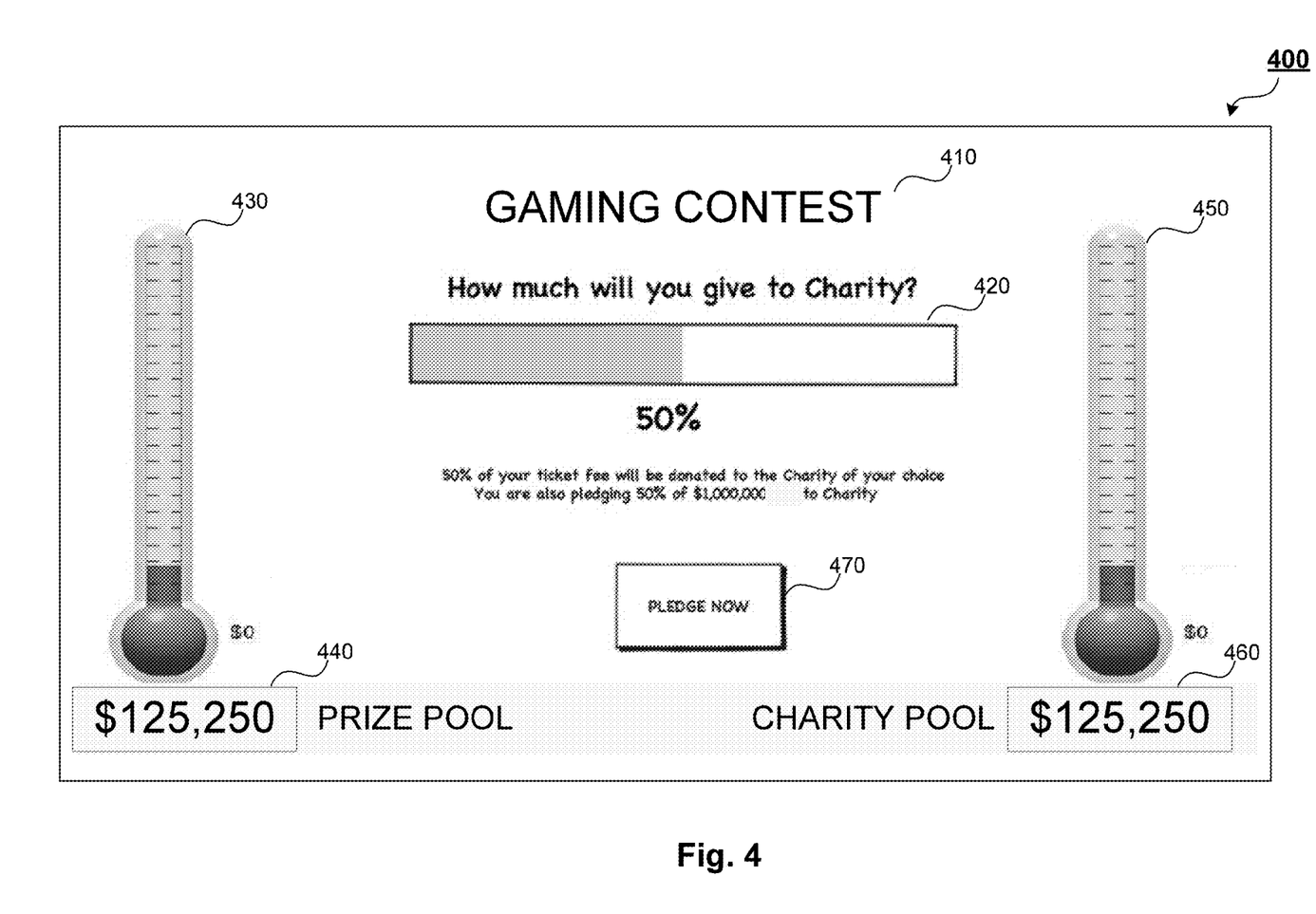
FIG. 4 shows an overview screenshot displayed by a gaming server in accordance with an embodiment of the present disclosure.

The method of conducting a game and distributing funds associated with that game may be implemented using the computer system 200 wherein the processes of FIGS. 1, 3, and 4 described herein may be implemented as one or more software application programs 233 executable within the computer system 200. In particular, the steps of the method of distributing funds, including the determination of the prize pool and charity pool dependent upon donated amounts and pledged amounts, are effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the ticket selling, recording of ticketing information, recording of donations and pledges, and prize and charity pool determining methods and a second part and the corresponding code modules manage a user interface between the first part and the user.

The software 233 is typically stored in the HDD 210 or the memory 206. The software is loaded into the computer system 200 from a computer readable medium, and executed by the computer system 200. Thus, for example, the software 233 may be stored on an optically readable disk storage medium (e.g., CD-ROM) 225 that is read by the optical disk drive 212. A computer readable medium having such software or computer program recorded on it is a computer program product. The use of the computer program product in the computer system 200 preferably effects an apparatus for conducting a game associated with a set of charities, wherein the apparatus determines a distribution of funds between a charity pool and a prize pool dependent upon a portion of ticket prices donated by ticket purchasers and further dependent upon a portion of the funds pledged by the purchaser of the winning ticket in the game.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of software, application programs, instructions and/or data to the computer module 201 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfill various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the system 200 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 1105 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The disclosed gaming and fund distribution arrangements use input variables 254, which are stored in the memory 234 in corresponding memory locations 255, 256, 257. The gaming and fund distribution arrangements produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

(a) a fetch operation, which fetches or reads an instruction 231 from a memory location 228, 229, 230;

(b) a decode operation in which the control unit 239 determines which instruction has been fetched; and (c) an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the processes of FIGS. 1, 3, and 4 is associated with one or more segments of the program 233 and is performed by the register section 244, 245, 247, the ALU 240, and the control unit 239 in the processor 205 working together to perform the fetch, decode, and execute cycles for every instruction in the instruction set for the noted segments of the program 233.

The method of distributing funds associated with a game may alternatively be implemented in dedicated hardware such as one or more integrated circuits performing the functions or sub functions of ticket selling, recording donations and pledges, determining a winner of the game, and distributing funds to determine a charity pool and a prize pool dependent upon the donations and a pledge associated with a winning ticket of the game. Such dedicated hardware may include graphic processors, digital signal processors, or one or more microprocessors and associated memories.

FIG. 3 is a schematic block diagram of a gaming system 300 in accordance with the present disclosure. The gaming system 300 includes a gaming server 310 coupled to a communications network 390. The communications network 390 may include, for example, a local area network (LAN), a wide area network (WAN), the Internet, and wireless and fixed line telecommunications services, or any combination thereof. The gaming server may be implemented using the computer module 201 of FIGS. 2A and 2B, and the communications network 390 may include the Wide-Area Communications Network 220 or the Local Area Communications Network 222, or a combination thereof.

The gaming server 310 includes a ticketing module 315, a database 320, an authentication server 325, a gaming engine 330, and a finance module 335, each of which is coupled to a communications bus 305. The ticketing module 315 executes computer program code for managing the sale of entries in each instance of a game. Requests for entries in a game are received at the gaming server 310 via the communications network 390. Such requests include information pertaining to each entry and may include, for example, contact information for the contestant, a selected charity that is to receive a portion of the ticket price as a donation and the actual portion amount nominated by the contestant, as provided in step 120 of FIG. 1. The contact information may include, for example, but is not limited to, a name, email address, telephone number, address, a registered player number, or any combination thereof. Each request also includes information relating to the portion of the prize pool, or total pool, that each contestant is pledging to charity, in the event that the contestant is a winner, as provided in step 130 of FIG. 1. As described above, in alternative implementations either one or both of the donation and pledge may be predefined by a regulatory authority, a gaming operator, a charity, or an external agency.

The ticketing module 315 executes code to ensure that an appropriate number of tickets are available for sale for each relevant instance of the game and may monitor the ticket selling period to ensure that tickets are only sold during the active ticket selling period. In one implementation, the ticketing module 315 sends a copy of the ticket as an electronic message in response to a request for an entry in the game. The electronic message may take the form, for example, of an email or a Short Message Service (SMS) "text" message, and includes ticketing information, which may include, for example, a ticket identifier, an indication of the portion of the ticket price nominated by the purchaser as a donation, an indication of the pledge, or any combination thereof. The ticketing information is viewable on a display of a computing device accessed by the purchaser, such as the video display 214 coupled to the computer module 201, and may be printed on a printer 215 to provide a hard copy of the ticket. In one implementation, the purchaser is able to access the gaming server 310 at a later time to view the ticketing information associated with all tickets purchased by that purchaser. Accessing the gaming server 310 may require the purchaser to register with the gaming server and log in using a user identifier and password, or other identifying information.

The database 320 stores ticketing information associated with each ticket and optionally stores information relating to players who purchase entries in each game. The database 320 optionally creates an historical record of statistics associated with each player. The database 320 is adapted to optionally store links between players that know each other or are related by other means. Such links may be established by data-mining online resources such as LinkedIn, My Space, Facebook, and Twitter. These links may optionally be utilized to promote the game and the associated charities by posting messages online or sending emails to other potential players once a player purchases a ticket. That is, when a first contestant purchases a ticket, a message advising of the first contestant's selected charity, the donated amount, and the pledged portion of the potential winnings is posted online, such as in a tweet on Twitter or on the Facebook Wall of the Facebook page associated with the first contestant. Alternatively, an email is sent to contacts in the address book of the first contestant. Each of the online messages, irrespective of the medium, increases the profile of the game and the charities and seeks to invite other people to join the game and have a chance of winning.

The authentication server 325 validates players to provide a level of confidence that each player is legitimate. The authentication server 325 may, for example, check Internet Protocol (IP) addresses, or validate credit cards or other online payment accounts, such as PayPal. The authentication server 325 may also perform validation checks of players by auditing information available through other online resources, such as social media networks, including My Space, Facebook, and Twitter. Such online resources assist in validating players by providing references among players, which enables players to have a high degree of confidence that other players are real and that the game is legitimate.

The gaming system 300 also shows a promoter server 345 coupled to the communications network 390. In one implementation, the gaming server 310 delivers a game to a remote promoter server 345 via the communications network 390. In one implementation, the operator of the lottery server 310 receives payment for delivering and conducting the game. In one example, the payment includes a portion of a prize pool raised from the sale of entries in the game.

In one example, the promoter associated with the promoter server 345 wants to run a fundraising event for a plurality of charities. The promoter advertises the fundraising event through the promoter server 345. Contestants buy entries in the fundraising event by accessing one or more computing devices to send requests to the ticketing module 315 via the promoter server 345 and the communications network 390. The requests are received by the ticketing module 315 of the gaming server 310 and processed in accordance with steps 110 to 130 of FIG. 1. Once a prescribed number of tickets has been sold or a predefined time has arrived, or a combination thereof, and the ticket selling period is no longer active, the gaming engine 330 of the gaming server 310 executes instructions of a gaming application to conduct the game, in conjunction with ticketing information stored in the database and in accordance with step 140 of FIG. 1, and determines one or more winners, dependent upon the game format.

In one arrangement with multiple winners, each prize position is associated with a portion of the prize pool. Each winner then reconciles their respective portion of the prize pool. For example, in an embodiment in which a game format includes two semi-finals, each contested by two players, the two players who are knocked out in the semi finals might each receive 10% of the prize pool. Their pledge would apply to that 10% of the prize pool.

The financial server determines the respective prize pool and charity pool, dependent upon the amounts committed to the respective charities by the contestants when purchasing their tickets and also dependent upon the pledge nominated by the determined winner of the game. The prize pool is then distributed to the prize winner(s).

The gaming server also includes a memory 332 for storing data and a computer program and a processor 334 coupled to the memory for executing instructions of the computer program stored in the memory 332 and code associated with the other modules of the gaming server 310. In an alternative implementation, one or more processors for executing instructions relating to a gaming application are located in one or more of the ticketing module 315, the authentication server 325, the gaming engine 330, and the financial server 335.

The gaming system 300 also shows a plurality of computing devices coupled to the communications network 390, including a portable computing device 360, a personal computer 365, and a mobile telephone 370. The portable computing device may include, for example, a smartphone, a mobile telephone handset, a laptop computer, or a personal digital assistant (PDA). Each of the portable computing device 360, the personal computer 365, and the mobile telephone 370 can be utilized to access a game being run by the gaming server 310. Alternatively, the portable computing device 360, the personal computer 365, and the mobile telephone 370 can be utilized to access the promoter server 345 or a similar server that is promoting a game, wherein the execution of the game is performed by the gaming server 310. Thus, a person wanting to purchase a ticket in the game can utilize one of the plurality of computing devices coupled to a communications link to access the gaming server 310 and purchase one or more tickets by sending a request to the ticketing module 315 of the gaming server 310.

The gaming system 300 further shows a government/enterprise server 385 that is coupled to the communications network. Depending on the auditing requirements of the jurisdiction(s) in which a game is being conducted, relevant data is transmitted from the gaming server 310 to the government/enterprise server 385 to satisfy any auditing requirements. Such relevant data may include, for example, payment of a portion of the total ticket revenue to cover taxes and licensing fees.

One implementation provides an additional step to the method 100 of FIG. 1, wherein a winner identified during conduct of the game in step 140 is provided with an opportunity to increase the portion of the total pool pledged to charity. For example, a winning contestant that pledged 25% of the total pool to charity during step 130 may choose to increase the amount pledged to charity to 35%, once the contestant has been advised that he/she has won. As described above, however, the minimum value of the charity pool is determined by the donations pledged by all of the ticket purchasers, so any increase to the amount pledged to charity by the winner would have to at least meet the minimum value of the charity pool.

Figure 5:
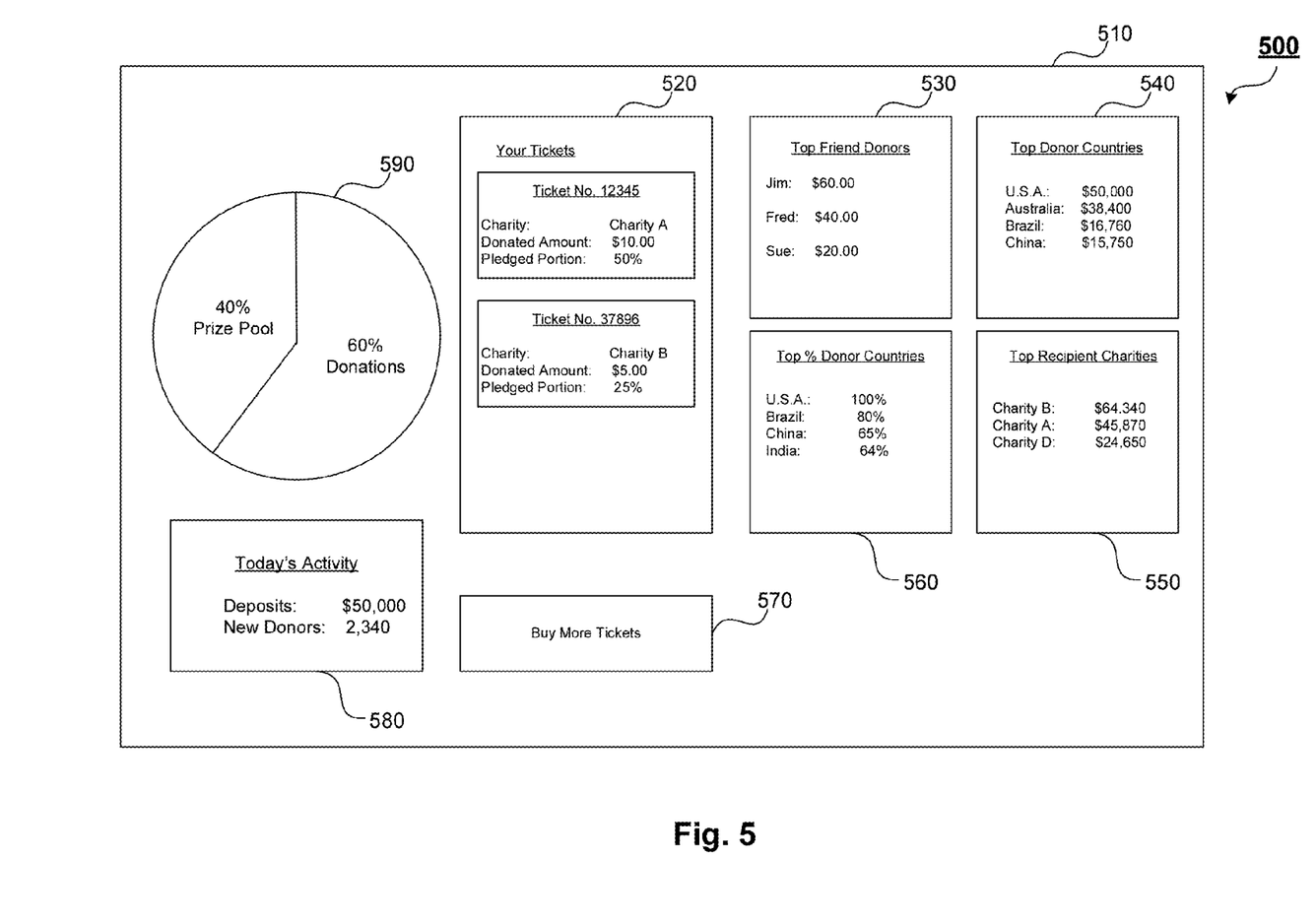
FIG. 5 shows a screenshot displayed by a gaming server in accordance with an embodiment of the present disclosure.

FIGS. 4 and 5 are schematic representations of screenshots displayed by a graphical user interface implemented by the gaming server 310 of FIG. 3. FIG. 4 shows an overview screenshot 400 presented to a prospective contestant in a game entitled "Gaming Contest", as shown by the banner 410. The overview screenshot 400 also shows a first gauge 430 relating to the prize pool associated with the gaming contest and a second gauge 450 relating to the charity pool associated with the gaming contest. The present prize pool is indicated at a prize pool display 440 as being $125,250. The present minimum charity pool is indicated at a charity pool display 460 as also being $125,250. This indicates that the average contestant in the gaming contest has donated 50% of the ticket fee to one of the associated charities and pledged 50% of the total pool to charity. In the example provided hereafter, tickets for the contest of FIG. 4 cost $20 each.

The overview screenshot 400 also includes a sliding bar 420 that enables the prospective contestant to select the portion of the ticket fee that is to be donated to a selected charity from the set of charities associated with the gaming contest. In this example, there are five charities associated with the gaming contest: Charity A, Charity B, Charity C, Charity D, and Charity E. Further, the gaming contest is implemented such that the portion of the ticket fee that is donated to the selected charity is also the portion of the total prize pool that the contestant is pledging. The overview screenshot 400 further includes a button 470 that the prospective contestant pushes in order to progress to a ticket purchasing screen.

FIG. 5 shows a second screenshot 500 that is presented to a contestant that has purchased one or more tickets in the gaming contest of FIG. 4. The second screenshot 500 shows a contestant that has logged into the gaming server 310 a record of tickets held by that contestant in the tickets window 520. In this example, the contestant has purchased two tickets. A first ticket is Ticket No. 12345, which indicates that the selected charity is Charity A, the donated amount is $10.00, and the pledged portion is 50%. A second ticket is Ticket No. 37896, which indicates that the selected charity is Charity B, the donated amount is $5.00, and the pledged portion is 25%. Thus, when purchasing the first ticket, Ticket No. 12345, the contestant selected Charity A and nominated 50% as the portion of the ticket price to be donated to Charity A and also pledged 50% as the portion of the total pool to be pledged to the charity pool should Ticket 12345 be the winning ticket. Therefore, at least $10.00 will be contributed to Charity A due to the contestant purchasing Ticket No. 12345. When purchasing the second ticket, Ticket No. 37896, the contestant selected Charity B and nominated 25% as the portion of the ticket price to be donated to Charity B and pledged 25% as the portion of the total pool to be pledged to the charity pool should Ticket 37896 be the winning ticket. Therefore, at least $5.00 will be contributed to Charity B due to the contestant purchasing Ticket No. 37896.

The second screenshot 500 also includes a chart 590 that indicates the current distribution of the total pool associated with the gaming contest between the prize pool and the charity pool. In the example, the chart 590 indicates that 60% of the total pool is presently committed to the charity pool to form the minimum charity pool, leaving a maximum prize pool of 40% of the total pool. The second screenshot 500 further includes a button 570 that enables the contestant to purchase further tickets in the gaming contest.

The second screenshot 500 includes a set of windows that provide information relating to the amounts that have already been donated and pledged. In the example of FIG. 5, the second screenshot 500 includes a "Top Friend Donors" window 530, a "Top Donor Countries" window 540, a "Top % Donor Countries" window 560, and a "Top Recipient Charities" window 550. The Top Friend Donors window 530 presents information relating to donations that have been made by people that are known or associated with the contestant viewing the screenshot. The Top Donor Countries window 540 shows a breakdown of the countries that have presently donated the most amount of money in respect of this gaming contest. The Top % Donor Countries window 560 ranks countries based on the average portion of the total pool that has been pledged by contestants from each country. The Top Recipient Charities window 550 displays the amounts that have presently been donated to the associated charities.

The displays 400 and 500 provide the contestant with opportunities to view (i) the minimum final amount a set of charities associated the contest is likely to receive, and (ii) the likely value of a prize awarded to the winner of the contest, and thus could be considered to provide transparency regarding allocation of funds in the contest. Such transparency may likely to encourage both participants most interested in supporting charity, and participants most interested in winning a high value prize to purchase tickets.

The information presented in the first screenshot 400 and the second screenshot 500 varies depending on the game and the particular application. Many variations are possible without departing from the spirit and scope of embodiments of the present disclosure.

The arrangements described are applicable to the computer and data processing industries and particularly for the gaming industry.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

What is claimed is:

1. A gaming server for conducting a game associated with a charity pool and a prize pool, said server comprising:
    at least one memory device storing at least a computer program;
    at least one processor coupled to said at least one memory device for executing said computer program;
    a ticket request receiving module, of said computer program, for receiving a plurality of requests to enter said game from one or more players, wherein each request includes a fee for entry, a donation corresponding to a portion of said fee for entry, and a pledge percentage;
    a ticketing module, of said computer program, for processing each of the plurality of requests to issue a corresponding ticket for entry in said game, wherein each ticket is associated with ticketing information that includes said fee for entry, said donation, and said pledge percentage;
    a database, in said at least one memory device, for storing ticketing information associated with each ticket issued in response to said plurality of requests; and a game application, stored in said at least one memory, including instructions, which when executed by the at least one processor, causes the at least one processor to perform the steps of:
    determining a total pool derived from a sum of each said fee for entry associated with each issued ticket;
    determining a winning ticket of said game from the issued tickets based upon said stored ticketing information;
    distributing said total pool between the charity pool and the prize pool based on said donation and said pledge percentage associated with the winning ticket; and
    awarding the prize pool to the player associated with the winning ticket.

2. The gaming server according to claim 1, wherein said ticket request receiving module is adapted to receive requests from a computing device via a communications link.

3. A gaming server for conducting a game associated with a charity pool and a prize pool, said server comprising:
    at least one memory device storing a computer program;
    at least one processor coupled to said at least one memory device for executing said computer program;
    a ticket receiving module, of said computer program, for receiving a plurality of requests to enter said game from one or more players, wherein each request includes a fee for entry, a donation to a charity corresponding to a portion of said fee for entry, and a pledge percentage;
    a ticketing module, of said computer program, for processing each request to issue a corresponding ticket for entry in said game, wherein each ticket is associated with ticketing information that includes said fee for entry, said donation to a charity, and said pledge percentage, and wherein the pledge percentage of each ticket provides a means of determining a value of said charity pool should that ticket win the game;
    a database, in said at least one memory device, for storing ticketing information associated with each ticket issued in response to said plurality of requests; and
    a game application, stored in said at least one memory, including instructions, which when executed by the at least one processor, causes the at least one processor to perform the steps of:
        determining a total pool derived from a sum of each said fee for entry associated with each issued ticket;
        determining a minimum value of the charity pool based upon said stored ticketing information, said minimum value being a sum of the donation to a charity amounts associated with each issued ticket;
        determining a winning ticket of said game from the issued tickets, based upon said stored ticketing information;
        determining a pledged charity amount of the winning ticket based on the pledge percentage associated with the winning ticket, wherein the pledged charity amount is a product of the total pool multiplied by the pledge percentage;
        distributing said total pool between the charity pool and the prize pool based on said determined pledged charity amount of the winning ticket; and
        awarding the prize pool to the player associated with the winning ticket;
    wherein the total pool is distributed such that the charity pool has a value of the greater value of (i) the minimum value of the charity pool and (ii) the determined pledged charity amount of the winning ticket; and
    wherein the prize pool comprises any remaining value of the total pool after distributing the charity pool.

4. A computer-implemented method of conducting a game, comprising the steps of:
    receiving, via a communications network, a plurality of requests to enter said game from one or more players, wherein each request includes a fee for entry, a donation corresponding to a portion of said fee for entry, and a pledge percentage;
    processing, via at least one processor, each of the plurality of requests to issue a corresponding ticket for entry in said game, wherein each ticket is associated with ticketing information that includes said fee for entry, said donation, and said pledge percentage, wherein the pledge percentage of each ticket provides a means of determining a value of said charity pool should that ticket win the game;
    determining, via the at least one processor, a total pool derived from a sum of each said fee for entry associated with each issued ticket;
    determining, via the at least one processor, a minimum value of a charity pool based upon a sum of the donation to charity amounts associated with each issued ticket;
    determining, via the at least one processor, a winning ticket of said game from the issued tickets, dependent upon said ticketing information;
    determining, via the at least one processor, a pledged charity amount of the winning ticket based on the pledge percentage associated with the winning ticket, wherein the pledged charity amount is a product of the total pool multiplied by the pledge percentage;
    distributing, via the at least one processor, said total pool between a charity pool and a prize pool based on said determined pledged charity amount of the winning ticket; and
    awarding the prize pool to the player associated with the winning ticket;
    wherein the total pool is distributed such that the charity pool has a value of the greater value of (i) the minimum value of the charity pool and (ii) the determined pledged charity amount of the winning ticket; and
    wherein the prize pool comprises any remaining value of the total pool after distributing the charity pool.

5. The method according to claim 4, wherein said portion of the fee for entry corresponding to the donation is selected by a player.

6. The method according to claim 4, wherein said portion of the fee for entry corresponding to the donation is predefined by at least one of a charity, a regulatory authority, a gaming operator, and a ticket selling agency.

7. The method according to claim 6, wherein said portion of the fee for entry corresponding to the donation is limited to a donation range determined by at least one of said charity, said regulatory authority, said gaming operator, or said ticket selling agency.

8. The method according to claim 4, wherein said pledge percentage is selected by a player.

9. The method according to claim 8, wherein said pledge percentage is limited to a pledge percentage range determined by at least one of a charity, a regulatory authority, a gaming operator, and a ticket selling agency.

10. The method according to claim 4, wherein said pledge percentage is predefined by at least one of a charity, a regulatory authority, a gaming operator, and a ticket selling agency.

11. The method according to claim 4, wherein for each ticket, said pledge percentage associated with said ticket is dependent upon said donation to charity associated with that ticket.

12. The method according to claim 4, wherein a set of charities is associated with said game and each request further includes a charity selected from said set of charities, wherein said processing step includes storing said selected charity in said ticketing information associated with the ticket issued in response to said request.

13. The method according to claim 12, wherein said distributing step is further based upon said selected charities stored in ticketing information associated with the issued tickets in said game.

14. A non-transitory computer readable storage medium having a computer program recorded therein, which when executed by at least one processor, causes the at least one processor to perform:

receiving a plurality of requests to enter a game from one or more players, wherein each request includes a fee for entry, a donation to a charity, and a pledge percentage;

processing each of the plurality of request to issue a corresponding ticket for entry in said game, wherein each ticket is associated ticketing information that includes said fee for entry, said donation to a charity, and said pledge percentage;

determining a total pool derived from a sum of each said fee for entry associated with each issued ticket;

determining a winning ticket of said game from said issued tickets, based on said ticketing information;

distributing said total pool between a charity pool and a prize pool based on said donation to charity and pledge percentage associated with the winning ticket; and     awarding the prize pool to the player associated with the winning ticket.

\* \* \* \* \*